United States Patent
Hlasny

(10) Patent No.: US 7,366,776 B2
(45) Date of Patent: Apr. 29, 2008

(54) SYSTEM AND METHOD FOR REESTABLISHING A COMMUNICATION PERIOD IN A RENDEZVOUS SCHEDULED SYSTEM

(75) Inventor: Daryl James Hlasny, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1101 days.

(21) Appl. No.: 10/402,037

(22) Filed: Mar. 28, 2003

(65) Prior Publication Data

US 2004/0024883 A1 Feb. 5, 2004

Related U.S. Application Data

(63) Continuation-in-part of application No. 10/315,620, filed on Dec. 10, 2002, and a continuation-in-part of application No. 10/006,440, filed on Nov. 20, 2001, now Pat. No. 7,024,482.

(51) Int. Cl.
*G06F 15/173* (2006.01)
*G06F 15/16* (2006.01)

(52) U.S. Cl. .................. 709/225; 709/227
(58) Field of Classification Search ........... 709/225, 709/227
See application file for complete search history.

(56) References Cited

U.S. PATENT DOCUMENTS

| | | | |
|---|---|---|---|
| 5,506,848 A | 4/1996 | Drakopoulos et al. ... | 370/95.1 |
| 6,031,832 A | 2/2000 | Turina ................ | 370/448 |
| 6,064,673 A | 5/2000 | Anderson et al. ...... | 370/389 |
| 6,115,390 A | 9/2000 | Chuah ................ | 370/443 |
| 6,198,728 B1 | 3/2001 | Hulyalkar et al. ..... | 370/252 |
| 6,230,014 B1* | 5/2001 | Freeze et al. ......... | 455/442 |
| 6,308,221 B1* | 10/2001 | Perlman et al. ....... | 709/241 |
| 6,625,134 B1* | 9/2003 | Ji et al. ............. | 370/331 |
| 6,748,451 B2* | 6/2004 | Woods et al. ......... | 709/248 |
| 7,003,568 B1* | 2/2006 | Chikada et al. ....... | 709/225 |

FOREIGN PATENT DOCUMENTS

WO    WO 01/41348    6/2001

\* cited by examiner

*Primary Examiner*—Kenny Lin
(74) *Attorney, Agent, or Firm*—Law Office of Gerald Maliszewski; Gerald Maliszewski

(57) ABSTRACT

A system and method are provided for reestablishing communication periods in a rendezvous scheduled communication system. The method comprises: establishing a plurality of time points (TPs); initiating a new communication period at a TP; terminating the new communication period and, then, resuming a previously established communication period. The new communication period may be terminated because a link cannot be established or alternately, the new communication period ends before the occurrence of the next TP because there is no further information to exchange. The system and method effectively extends the duration of communication periods for communication links where information exchange is required. It does this by allowing unused portions of communication periods for other communication links to be used on links where information exchanged is desired.

36 Claims, 6 Drawing Sheets

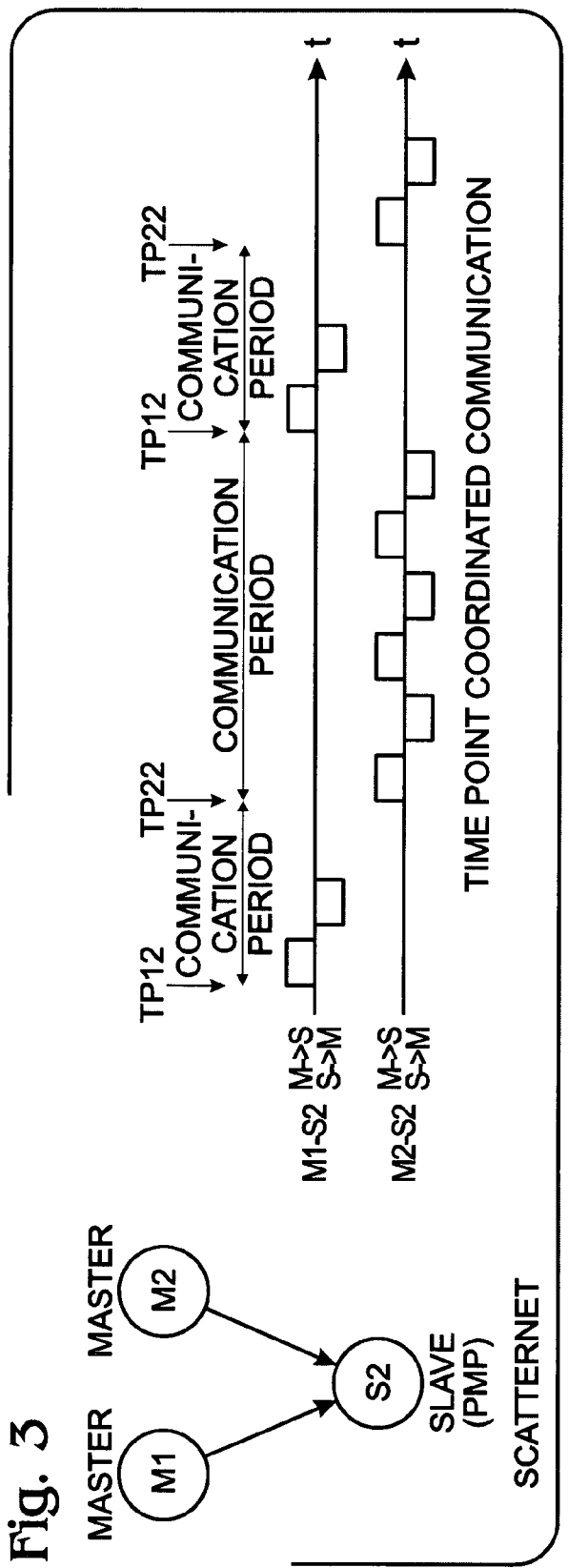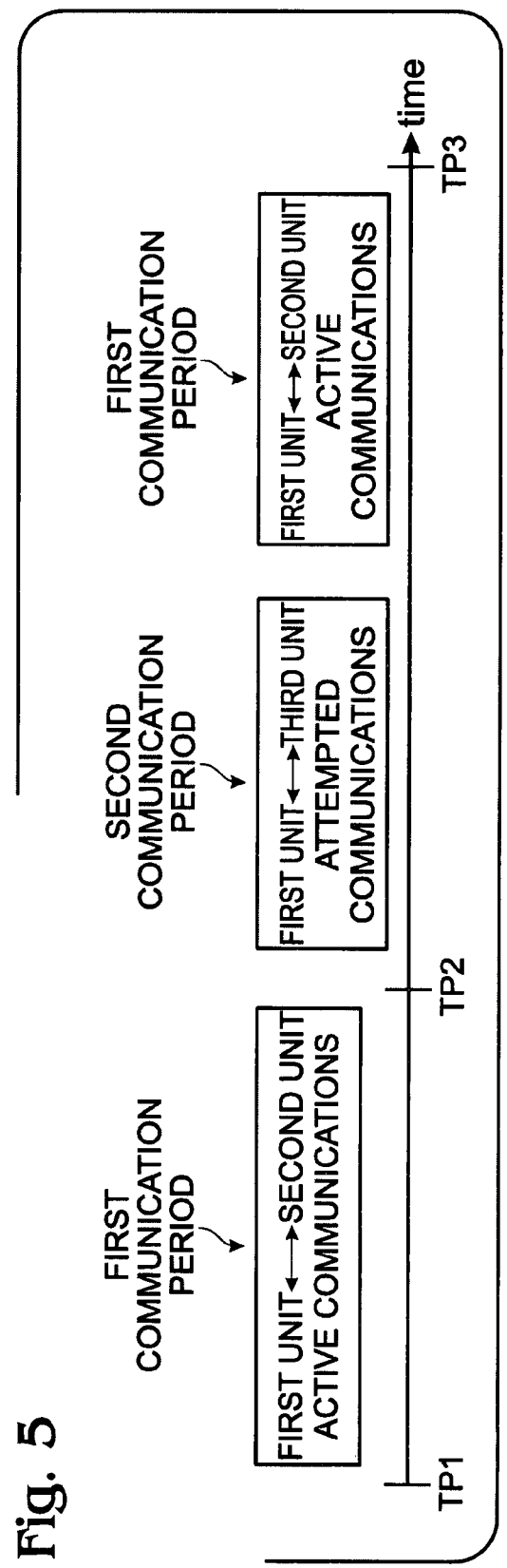

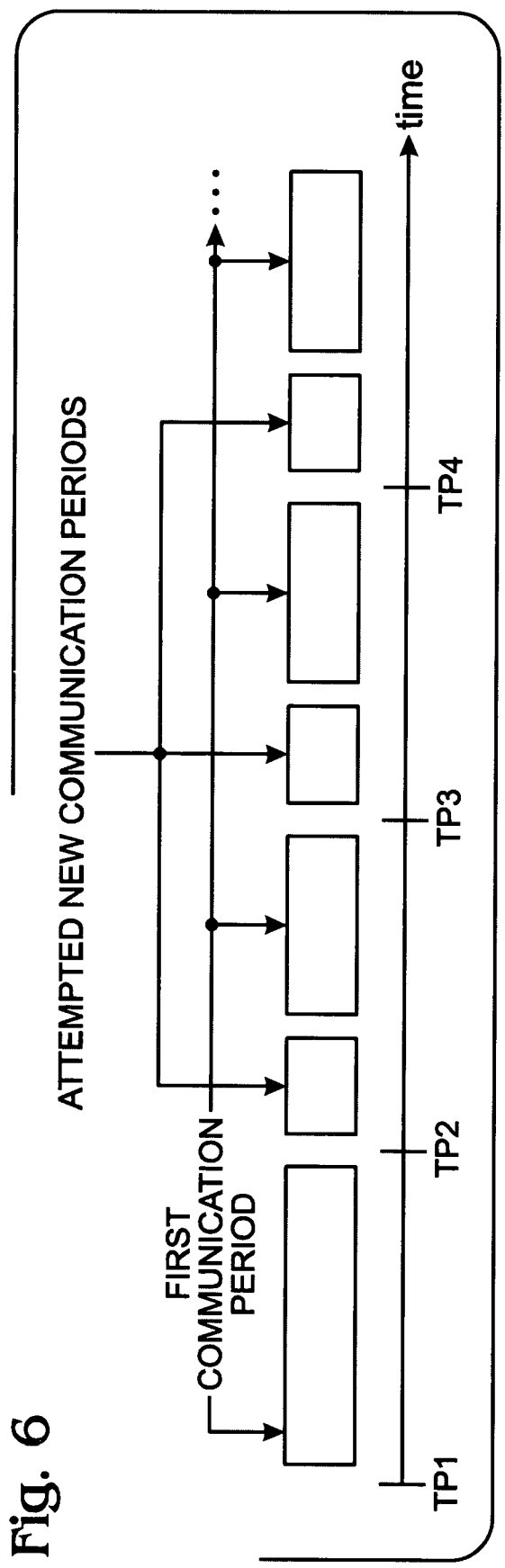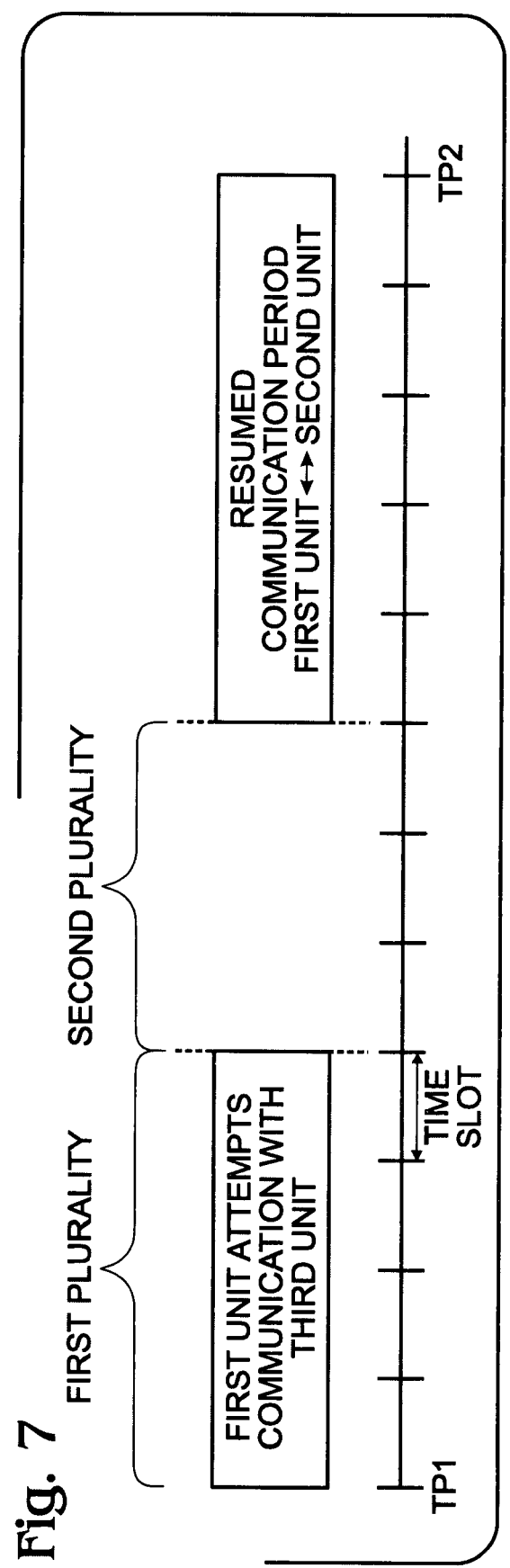

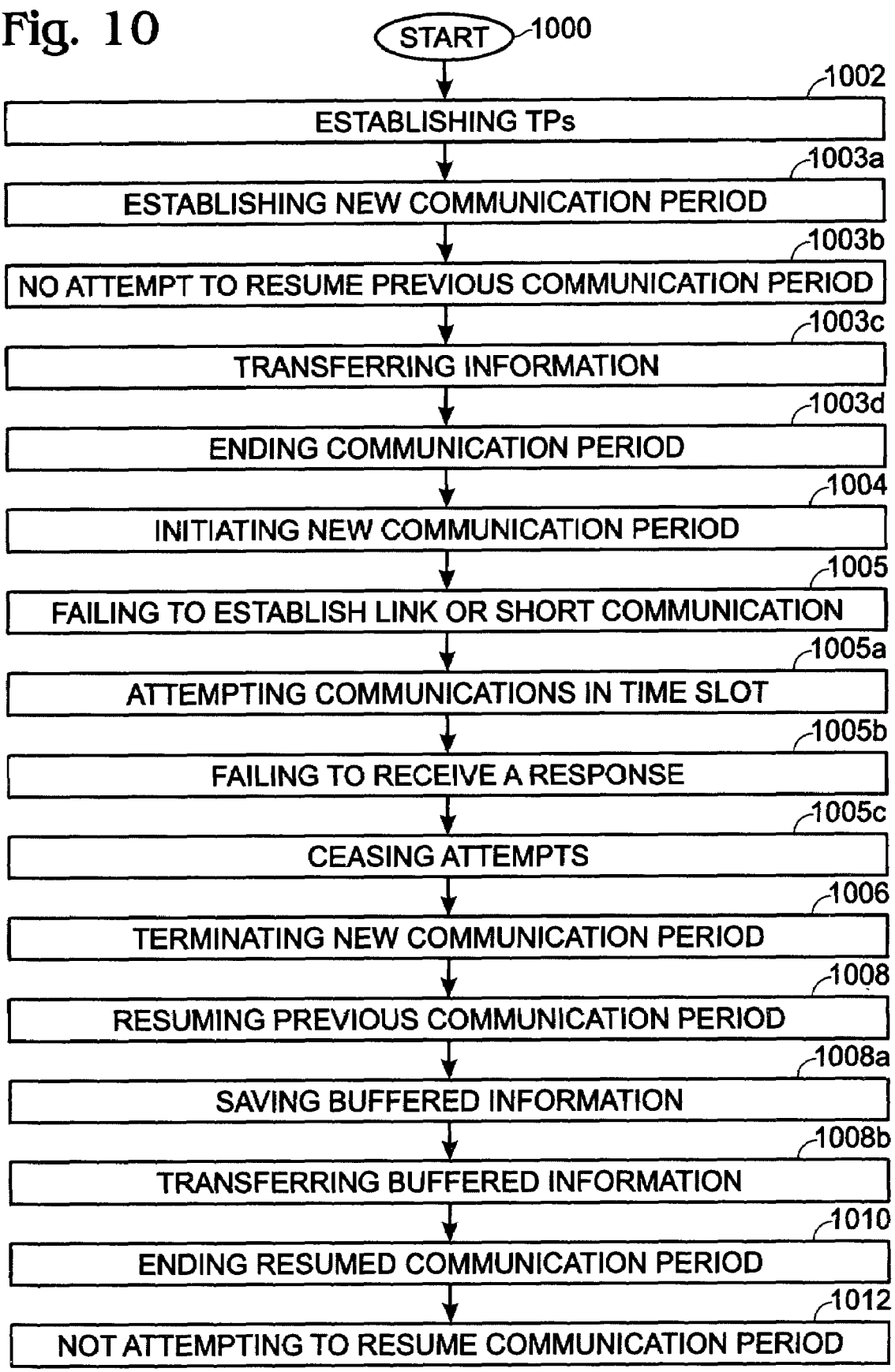

ns, and, more particularly, to a system and method for
automatically reestablishing a communication in a rendez-
vous scheduled network such as Bluetooth scatternets.

2. Description of the Related Art

FIG. 1 illustrates conventional Bluetooth piconet commu-
nication patterns (prior art). In Bluetooth, and similar com-
munication systems, a master/slave relationship is used to
control access of the communication channel. Communica-
tion occurs only between device pairs where one device is
the master and the other is slave. The slave is required to
listen for the master in all master-to-slave slots. The slave is
only allowed to transmit to the master when it receives a
packet addressed to it from the master. In this case the slave
is allow to transmit to the master in the following slave-to-
master slot. The master is free to communicate with any
slave in any master-to-slave slots. A piconet is a group of
devices comprised of one master and from one to seven
slaves.

FIG. 2 illustrates a conventional Bluetooth scatternet
communication pattern (prior art). In Bluetooth, a scatternet
is created when at least one device is active in more than one
piconet. The device that is present in more than one piconet
must share its communication capacity between piconets.
This device is known as a PMP (Participant in Multiple
Piconets). The PMP may be a slave in multiple piconets, or
a master in one piconet and a slave in one or more other
piconets. If the device has multiple piconet connections, the
previous rules used to control communication cannot be
used because of conflicting requirements. It is not possible
for a slave to listen in all master-to-slave slots. Because of
this rule, a higher-level scheduler is needed to manage the
orderly exchange of communication to PMPs.

FIG. 3 is a diagram illustrating pseudorandom time points
(prior art). One higher level scheduling method used to
manage communication in a scatternet is called pseudoran-
dom scheduling. Pseudorandom scheduling uses a system
that consists of time points (TP) that define the initiation of
a communication period. A communication period starts at
the TP and typically continues until terminated by another
TP for another communication link. The communication
period defines a time period where there is continuous data
exchange between a device pair. The termination of the
communication period typically occurs because another TP
occurs on another link, which starts a communication period
on that link. The location (in time) of the initiation TP is
determined by a pseudorandom generator. Both devices on
the communication link are able to determine the position of
the TPs and initiate communication when they occur. Each
communication link has a unique and random sequence of
TPs. A pseudorandom position of time points is used to
avoid any systematic collisions, allocating communication
capacity throughout the scatternet in a fair way.

Additional details of a Pseudorandom scheduling method
are provided in pending invention PSEUDO-RANDOM
DYNAMIC SCHEDULER FOR SCHEDULING COM-
MUNICATION PERIODS BETWEEN ELECTRONIC
DEVICES, invented by Daryl Hlasny, Ser. No. 10/006,440,
filed Nov. 20, 2001, which is incorporated herein by refer-
ence.

In a system that uses pseudorandom scheduling of com-
munication periods, the full duration of the communication
period is not used when no data is available for exchange.
The communication capacity of the communication period is
wasted in this case. It is then highly desirable to use this
capacity for communication on another link where there is
data to be transmitted. Furthermore, it is highly desirable to
distribute this unused capacity in a fair way between the
links where it can be used to maintain the fair distribution of
capacity in the system. More specifically, when a commu-
nication period is very short, as is the case when only polling
occurs during the communication period, it is desirable if the
remaining unused time in the communication period is used
effectively.

It would be advantageous if latency in a pseudorandom
scheduled communication network could be reduced.

It would be advantageous if the efficiency of a pseudo-
random scheduled communication system could be
improved.

It would be advantageous if the fairness of scheduling in
a pseudorandom communication system could be main-
tained, while reducing latency and improving efficiency.

It would be advantageous if unfinished communications
could automatically by continued in time slots where the
communicating pair have no information to transfer.

SUMMARY OF THE INVENTION

The invention disclosed herein provides a method for the
reestablishing communications in an effort to reduce system
latency and improve efficiency. The present invention
method is especially effective for bursty file transfer traffic
flows. Generally, initiation time points (TP) are pseudo
randomly positioned in time. The TPs are unique to each pair
of devices and only know by the device pair. These time
points define the possible initiation of communication
between a pair of devices. Communication continues until
either the data is exhausted, or another TP occurs that causes
communication to commence on another device pair.

When a communication period is short or never estab-
lished, the previous active communication period is rees-
tablished. This is an optimal approach for reducing latency,
as the previous active communication defines a link where
data is buffered and waiting to be exchanged. This method
assures that the communication capacity of a device is
effectively used when there is data ready to be transferred.

In this invention the communication period is bridged
over short or never-established communication periods
originally initiated for other links. This effectively lengthens
the communication period for devices that have data to
transfer and uses the communication resource effectively.

Conventionally, the impact of short or terminated com-
munication periods has been addressed by reducing the time between TPs. This gives a device an opportunity to establish a new communication period quickly, reducing the unused time. This has the negative effect of introducing additional TPs in to the system bring additional unnecessary overhead. Alternately, the prior art dynamically changes the density of TPs in an attempt to reduce the number of TPs on links where traffic is lower. This has the negative effect of increasing the latency associated with the beginning of a data transfer.

Accordingly, a method is provided for reestablishing communication periods in a rendezvous scheduled communication system. The method comprises: establishing a plurality of time points (TPs); initiating a new communication period at a TP; terminating the new communication period; resuming a previously established communication period; and, ending the resumed communication at the occurrence of the next TP.

The new communication period can be terminated because a link cannot be established. For example, a slave unit fails to respond to transmissions from a master unit. Alternately, the new communication period is terminated as the result of establishing a short communication period that ends before the occurrence of the next TP. Typically, a short communication period signifies that no (additional) information is to transferred.

Resuming a communication period also means that a communication period can be resumed in a number of consecutive TPs. For example, a unit may attempt, and fail, to establish a new communication period at each new TP. Every time the new communication period cannot be established, the unit attempts to resume the previously established communication period. Following the complete transfer of information, however, the unit no longer attempts to resume the previously established communication period in subsequent TPs.

In some aspects of the method, transferring information during a communication period includes buffering the information to be transferred in a first communication period. Then, continuing the transfer of information in the resumed communication period includes: saving the buffered information during the initiation of a new communication period; and, transferring the saved information from the buffer when the first communication period is resumed.

Additional details of the above-described method and a system for reestablishing communication periods in a rendezvous scheduled network are provided below.

BRIEF DESCRIPTION OF THE DRAWINGS

FIG. 3 is a diagram illustrating pseudorandom time points (prior art).

FIG. 5 is a timing diagram illustrating one aspect of the system of FIG. 4.

FIG. 6 is a timing diagram illustrating another aspects of the system of FIG. 4.

FIG. 7 is a timing diagram illustrating a different aspect of the system of FIG. 4.

FIG. 10 is a flowchart illustrating the present invention method for reestablishing communication periods in a rendezvous scheduled communication system.

DETAILED DESCRIPTION OF THE PREFERRED EMBODIMENTS

Figure 1:
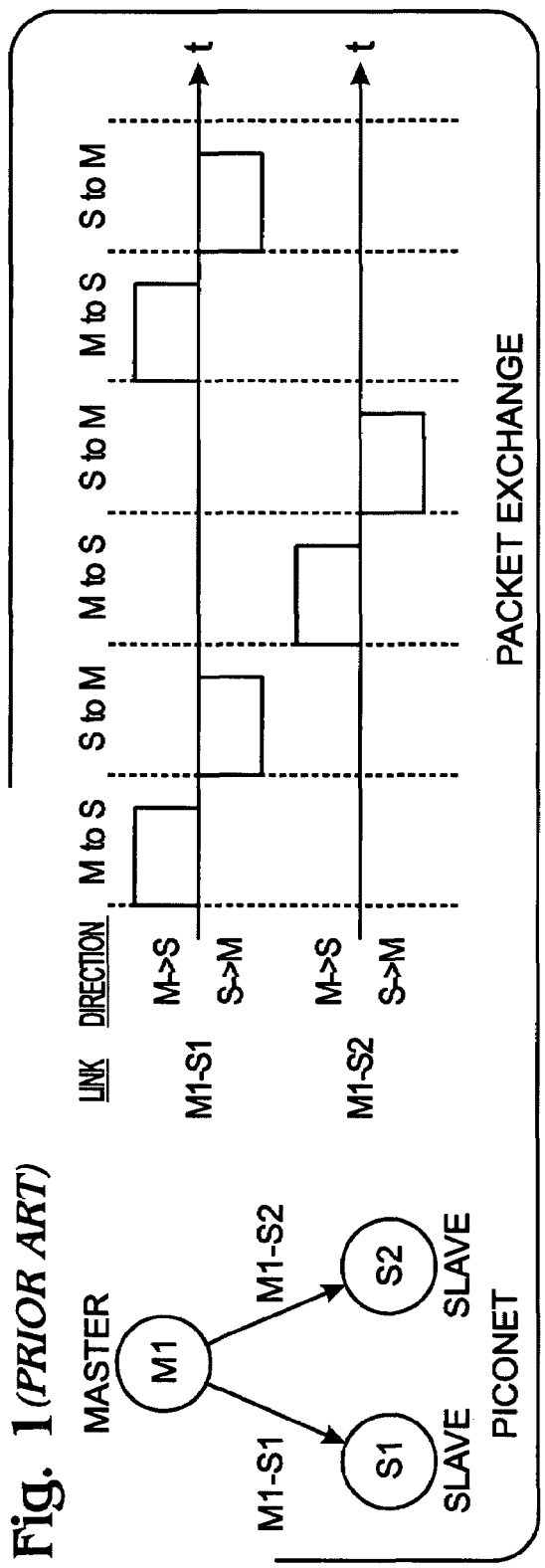
FIG. 1 illustrates conventional Bluetooth piconet communication patterns (prior art).
Figure 2:
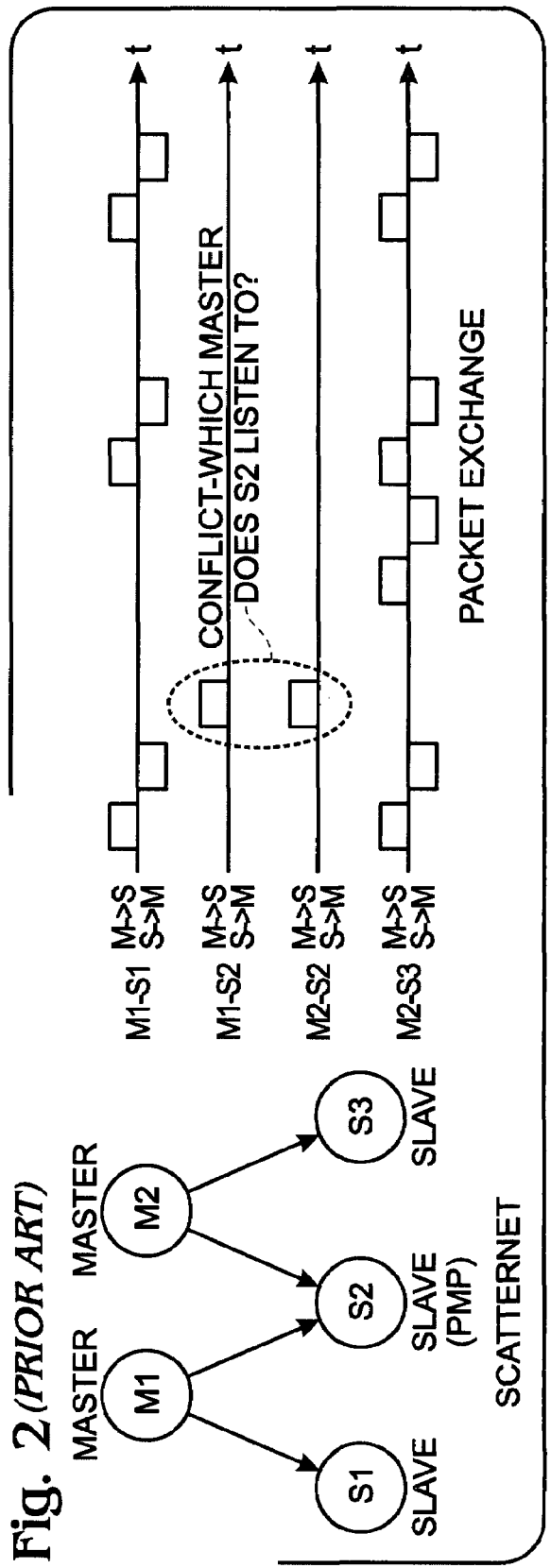
FIG. 2 illustrates a conventional Bluetooth scatternet communication pattern (prior art).
Figure 4:
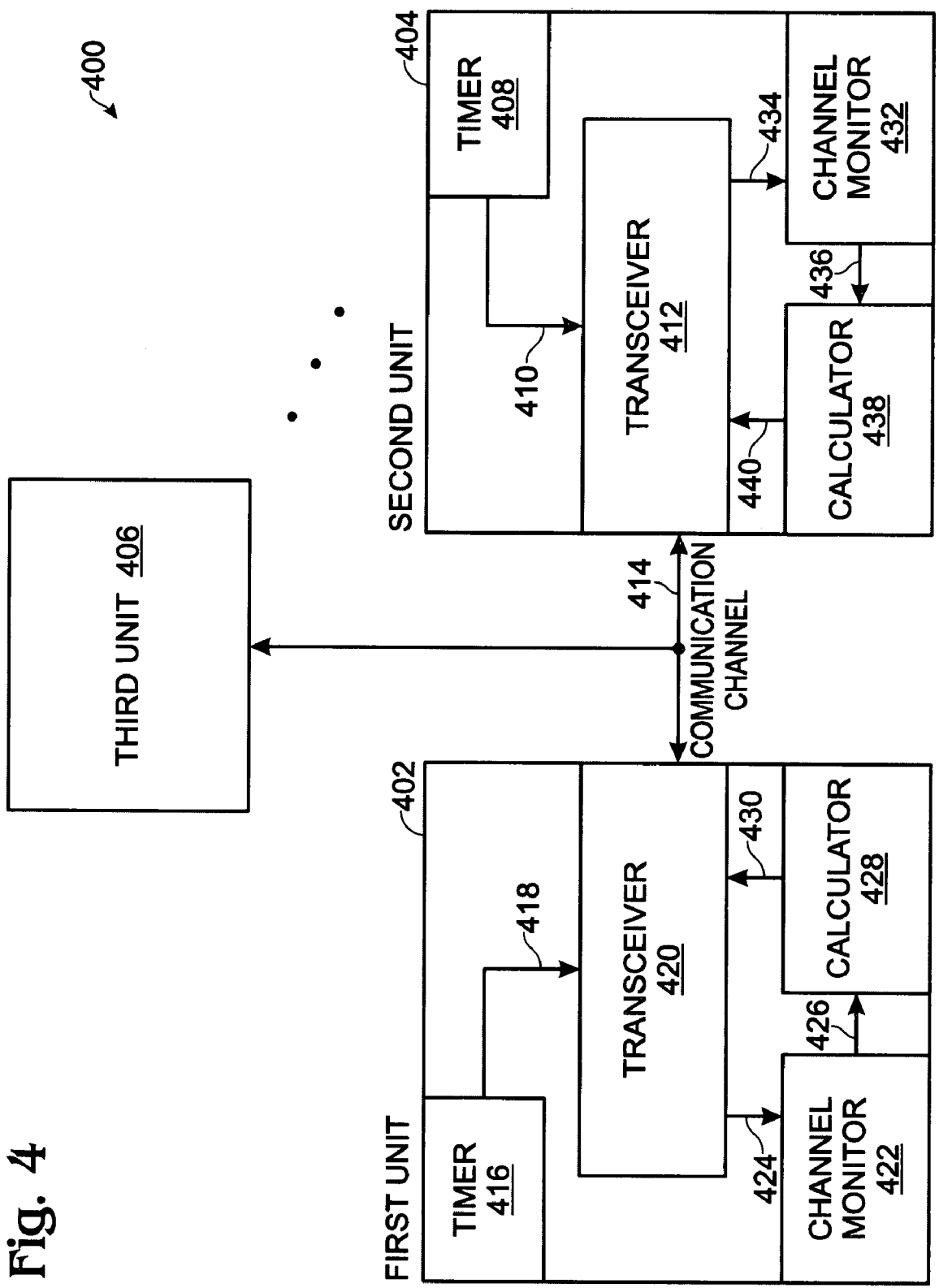
FIG. 4 is a schematic block diagram of the present invention system for reestablishing communication periods in a rendezvous scheduled communication system.

FIG. 4 is a schematic block diagram of the present invention system for reestablishing communication periods in a rendezvous scheduled communication system. The system 400 comprises a plurality of units. Three units are shown: first unit 402, second unit 404, and third unit 406. However, the system 400 is not limited to any particular number of units.

The second unit 404 includes a timer 408 with an output on line 410 to supply time points (TPs). The second unit 404 also comprises a transceiver 412 with an input on line 410 to accept TPs from the timer 408 and a port for communication monitoring and information transfer in response to the TPs. The port is connected to a communication channel 414. The communication channel can be enabled by a number of means including wired and/or wirelessly.

The first unit 402 includes a timer 416 with an output on line 418 to supply TPs, and a transceiver 420 with an input on line 418 to accept the TPs from the timer 416. In some aspects, the unit timers 408/416 supply a coordinated TP rendezvous schedule to their respective transceivers. The first unit 402 also has a port connected to the communication channel 414 to initiate a new communication period with the third unit 406 in response to a TP. In the event that the new communication period is terminated before the occurrence of the next TP, the first unit 402 initiates the resumption of a previously established communication period with the second unit 404.

The first unit 402 and the second unit 404 end a resumed communication period at the occurrence of the next TP. In fact, both new and resumed communication periods end at the occurrence of a new TP. More accurately, a communication period does not end, but is postponed, if it is resumed in a subsequent TP. However, the first unit does not attempt the resumption of a communication period in a TP, if a new communication period is established during that TP. The first unit 402 and second unit 404 are representative of other units in the system 400, such as the third unit 406.

As used herein, a "communication period" refers to a communication between units, and is not intended to imply a specific duration of time. A communication period may be as short as the time between two consecutive TPs. Alternately, a communication period may by conducted over several TPs. When conducted over several TPs, the communication period may be interrupted by other communication periods, or failed attempts to establish other communication periods.

FIG. 5 is a timing diagram illustrating one aspect of the system of FIG. 4. For example, the first unit 402 establishes a first communication period with the second unit 404, at a first TP. The first unit 402 ends the first communication period at a second TP, the next TP after the first TP. The first unit 402 then attempts a second communication period with a third unit (at TP2). If the first unit ends the second communication period before a third TP, the next TP after the second TP, it may resume the first communication period with the second unit (as shown), before the occurrence of the third TP.

Prior to terminating a new communication, for example the second communication of FIG. 5, the first unit has either failed to establish a communication link with a second unit, or established a short communication period with a second unit that ends before the occurrence of the next TP. The first unit establishes a short communication period with the third unit in response to determining that no additional information is to transferred between the units. A failure to establish a communication links means that the first unit is unable to communicate with the third unit, or the third unit is unable to communicate with the first unit, or both.

FIG. 6 is a timing diagram illustrating another aspects of the system of FIG. 4. This aspect of the system shows that the first unit is able to resume a communication period, with the second unit for example, in a first number of consecutive TPs, in response to attempting, and failing to establish new communication periods in the first number of consecutive TPs.

The first and second units begin the transfer of information during an established new communication period, at TP1 for example, and continue the transfer of information in a resumed communication period. However, the first unit does not attempt the resumption of a communication period with the second unit in subsequent TPs, following the complete transfer of information.

More specifically, the first and second units buffer the information to be transferred during a first communication period, and continue the transfer of information in the resumption of the first communication period by: saving the buffered information when a new communication period is initiated; and, transferring the saved information from the buffer if the first communication period is resumed.

Returning to FIG. 4, in some aspects the system 400 is a Bluetooth piconet. Then, the first and second units 402/404 can be master and slave units in the piconet. Alternately, the plurality of units in system 400 establish a Bluetooth scatternet with a plurality of master units, first unit 402 and third unit 406 for example, and at least one slave unit, the second unit 404 for example. In some aspects, a unit can performs as a master unit in a first piconet and a slave unit in at least one other piconet.

The present invention has equal applicability to master and slave units, with the only difference being that master units initiate attempts to establish either new or resumed communication periods. For example, a slave unit transceiver monitors for a master unit transmitting in its assigned time slot. If the transmission is received by the slave unit, it transmits a response. A new communication period is established with the master unit, and information is transferred with the master unit. However, a slave unit fails to establish a new communication period if the transceiver does not receive a transmission in its assigned time slot.

A master unit transceiver may attempt communications with a first slave unit in the first slave's assigned time slot, and if a response is not received, delays a period of time approximately equal to the time required to receive a response from its last transmission. After the delay, the master unit may attempt to resume a previously established communication period with a second slave unit.

FIG. 7 is a timing diagram illustrating a Bluetooth aspect of the system of FIG. 4. With respect to a Bluetooth system, the unit timers supply time slot control signals to their respective transceivers to regulate transceiving timing. More specifically, the timers may supply a coordinated pseudo-random rendezvous schedule of TPs.

For example, the first and third units have a schedule (an assigned time slot) that dictates that they attempt to establish a new communication period at TP1. The first unit may cease communication attempts to the third unit in its assigned time slot after failing to communicate in a first plurality of time slots. Then, the first unit resumes a (previously established) communication period, with the second unit for example, in time slots subsequent to the first plurality of time slots. More specifically, the first unit attempts to communicate with the second unit, to resume a communication period in a second plurality of time slots, subsequent to the first plurality of time slots. In the example of FIG. 7, the first plurality is equal to 4 and the second plurality is equal to three. However, the invention is not limited to any particular first and second plurality values. Both devices are aware, or can be made aware of the duration of the first and second plurality of values. This "knowledge" may exist before the system elements are initialized, for example, or may result from communication between devices.

Returning to FIG. 4, some aspects of the system comprise additional elements. The first unit 402 has a channel monitor 422 with an input on line 424 connected to the transceiver 420 and an output on line 426 to supply measured transceiver channel conditions. A calculator 428 has an input on line 426 and an output on line 430 connected to the transceiver 420 to vary the value of the first plurality and the second plurality in response to the channel conditions. For example, the first unit may increase the value of the first plurality in response to noisy channel conditions. Likewise, the second unit 404 has a channel monitor 432 with an input on line 434 connected to the transceiver 412 and an output on line 436 to supply measured transceiver channel conditions. A calculator 438 has an input on line 436 and an output on line 440 connected to the transceiver 412 to vary the value of the first plurality and the second plurality in response to the channel conditions.

FUNCTIONAL DESCRIPTION

The present invention recognizes that traffic flows are typically bursty for the most common applications, e.g., file transfer, web page download, etc. This means that a communication link will typically either fully use the communication period or have the minimum exchange needed to poll for communication exchange. This invention permits communication periods that have been interrupted by such polling to be reestablished. The method also works for dead links where communication cannot be established because the other device does not respond to a poll.

Figure 8:
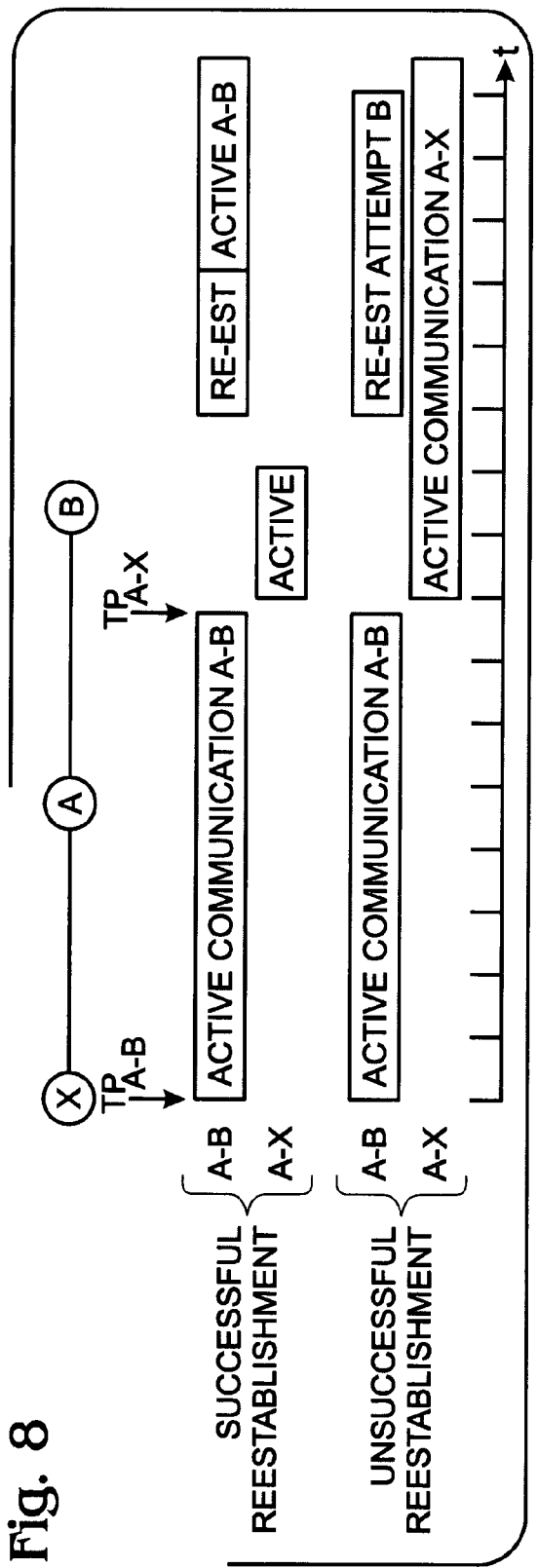
FIG. 8 is a diagram illustrating the present invention reestablishment procedure.

FIG. 8 is a diagram illustrating the present invention reestablishment procedure. For the purpose of this explanation the devices involved in the communication link are designated as follows:

Device A—device that caused termination of the communication period; and,

Device B—other device on the link.

In the pseudorandom method of scheduling communication, device A terminates communication with device B when a TP occurs for link A-X. Device A attempts to communicate with device X. Device B is typically idle. At a fixed time window after the termination event between device A and B, both devices attempt to communicate with each other if available. Device A is likely to be available if it polls Device X and finds no data to exchange, or if device X did not respond. If both devices A and B are available, the reestablishment attempt succeeds and the communication period is reestablished. If either device A or B does not attempt communication at this time, the reestablishment attempt fails.

Figure 9:
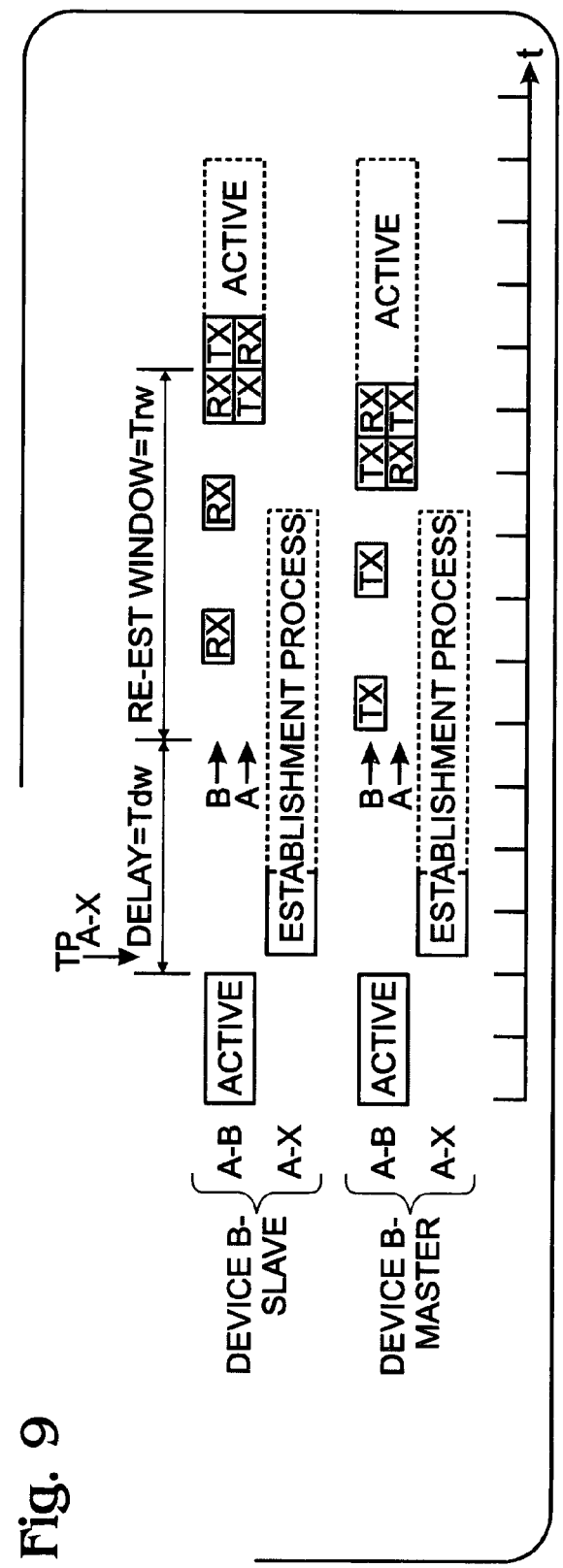
FIG. 9 is a more detailed drawing of the reestablishment procedure as applied to a Bluetooth system.

FIG. 9 is a more detailed drawing of the reestablishment procedure as applied to a Bluetooth system. The reestablishment window (Trw) is positioned after a delay of Tdw slots. The value of Tdw is set depending on the expected time needed for device A to complete a polling communication with device X. The minimum value is 2 slots, this is the minimum time needed for a packet exchange when both piconets are slot synchronized. When not synchronized, an additional 2 slots must be added yielding a minimum of 4-slot delay value. The reestablishment window width (Trw) is typically 2 to 6 slots depending on the quality of the channel. Because the reestablishment window is used to detect if a device is available, there is a tradeoff between the time wasted when the attempt fails and the likelihood of establishing the communication period when channel conditions are impaired. Channel impairment may impact either channel A-B or A-X. The window size can be selected to compensate for impairment on one or both links. In the normal case, with a good communication channel, the process will use only 4 slots.

FIG. 9 illustrates the reestablishment process with a delay of 4 slots and a reestablishment window of 6 slots. Both roles are shown with the corresponding link traffic. In the case where device B is a slave, B listens in all the master-to-slave slots during the reestablishment window. If device B is a master, it will transmit single slot packets throughout the reestablishment window. Communication is reestablished when a response is received from the other device. It no response is received the reestablishment attempt has failed.

It is also possible to view the process as the generation of a new TP at a known time position, after the termination of the previous communication period. In this case the rules for the establishment of the communication period are used. These rules are similar to the rule described for reestablishment, but the expectation for both devices to attend this TP is lower that for a normal TP.

FIG. 10 is a flowchart illustrating the present invention method for reestablishing communication periods in a rendezvous scheduled communication system. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 1000. Step 1002 establishes a plurality of time points (TPs). Step 1004 initiates a new communication period at a TP. Step 1006 terminates the new communication period. Step 1008 resumes a previously established communication period. Step 1010 ends the resumed communication period at the occurrence of the next TP.

Some aspects of the method include further steps. Step 1003a, in response to initiating a new communication period at a TP, establishing a first communication period at a first TP. Step 1003d ends the first communication period at a second TP, the next TP after the first TP. Then, initiating a new communication period at a TP in Step 1004 includes initiating a second communication period at the second TP. Terminating the new communication period in Step 1006 includes ending the second communication period before a third TP, the next TP after the second TP. Then, resuming a communication period in Step 1008 includes resuming the first communication period before the occurrence of the third TP.

In some aspects a further step (Step 1005), prior to terminating the new communication period, performs an action such as failing to establish a communication link or establishing a short communication period that ends before the occurrence of the next TP. Establishing a short communication period that ends before the occurrence of the next TP includes signaling that no additional information is to transferred. Failing the establishing a communication link means that at least one of the units is unable to communicate with its communication partner.

In other aspects, resuming a communication period in Step 1008 includes resuming a communication period in a first number of consecutive TPs, in response to attempting, and failing to establish new communication periods in the first number of consecutive TPs. That is, Steps 1005, 1006, and 1008 are repeated a first plurality of times.

In some aspects, Step 1003a establishes a new communication period at the TP, as mentioned above. Then Step 1003b, in response to establishing a new communication period, does not attempt the resumption of a previously established communication period.

In some aspects, a further step, Step 1003c transfers information during a communication period. Then, resuming a communication period in Step 1008 includes continuing the transfer of information. In other aspects, Step 1012, following the complete transfer of information in a first communication period, does not attempt the resumption of the first communication period in subsequent TPs.

In some aspects, transferring information during a communication period (Step 1003c) includes buffering the information to be transferred in a first communication period. Then, continuing the transfer of information in the resumed communication period in Step 1008 includes substeps. Step 1008a saves the buffered information during the initiation of a new communication period. Step 1008b transfers the saved information from the buffer when the first communication period is resumed.

In some aspects of the method, establishing a plurality of time points (TPs) in Step 1002 includes establishing a plurality of TPs between a master and a corresponding plurality of slaves. Then, initiating a new communication period in Step 1004 includes transmitting to initiate a new communication period between the master and a corresponding slave at each TP. In some aspects, Step 1002 establishes a Bluetooth piconet with at least one master and at least one slave. Alternately, Step 1002 establishes a Bluetooth scatternet with a plurality of masters. For example, a scatternet can be formed with a unit that is a master in a piconet and a slave in at least one other piconet.

In some aspects, establishing a plurality of TPs between a master and a corresponding plurality of slaves in Step 1002 includes establishing time slots for each master and slave transmission. In this example it is assumed that Step 1005 fails to establish a communication link and the step includes substeps. Step 1005a attempts communications in an assigned time slot. Step 1005b fails to receive a response. Step 1005c ceases communication attempts after a first plurality of time slots. Resuming a communication period in Step 1008 includes attempting to resume a communication period, in time slots subsequent to the first plurality of time slots.

In some aspects, attempting communications in time slots subsequent to the first plurality of time slots (Step 1008)

includes attempting communications in a second plurality of time slots, subsequent to the first plurality of time slots.

In other aspects, Step 1002 establishes a pseudorandom rendezvous schedule. Establishing a new communication period (Step 1003a) includes substeps (not shown). In Step 1003a1 a slave monitors for a master transmitting in the master-to-slave time slot. Step 1003a2, in response to the slave receiving a transmission from the master, transmits a response. Step 1003a3 transfers information between the master and the slave.

In other aspects, failing to establish a communication link in Step 1005 includes substeps (not shown). In Step 1005d a master transmits to a slave in the slave's assigned time slot. In Step 1005e a response is not received. Then, resuming a communication period in Step 1008 includes the master delaying a period of time approximately equal to the time required to receive a response from its last transmission.

In other aspects, failing to establish a communication link in Step 1005 includes alternate substeps (not shown). In Step 1005f a first slave monitors a plurality of master-to-slave time slots. In Step 1005g the first slave does not receive a transmission addressed to the first slave.

In some aspects, ceasing communication attempts after a first plurality of time slots in Step 1005c includes varying the value of the first plurality in response to channel conditions. Then, attempting communications to resume a communication period, in a second plurality of time slots, subsequent to the first plurality of time slots, in Step 1008 includes varying the value of the second plurality in response to channel conditions.

A system and method for reestablishing communications in a rendezvous scheduled communication system has been provided. Examples have been given of some specific reestablishment mechanisms, however, the invention is not limited to merely these examples. Likewise, examples have been give in the context of a Bluetooth system, however, the invention is applicable to other systems. Other variations and embodiments of the invention will occur to those skilled in the art.

I claim:

1. In a rendezvous scheduled communication system, a method for reestablishing communication periods, the method comprising:
   establishing a plurality of time points (TPs);
   initiating a new communication period at a first TP;
   terminating the new communication period in response to performing an action selected from the group including failing to establish a communication link and establishing a short communication period that ends before the occurrence of a second TP, the next TP after the first TP, and signaling that no additional information is to be transferred;
   resuming a previously established communication period before the occurrence of the second TP;
   wherein resuming the previously established communication period includes resuming the previously established communication period in a first number of consecutive TPs, in response to attempting, and failing to establish new communication periods in the first number of consecutive TPs.

2. The method of claim 1 further comprising:
   ending the resumed communication period at the occurrence of the second TP.

3. The method of claim 2 further comprising:
   subsequent to the second TP, establishing the new communication period that ends at a third TP, the next TP after the second TP; and,
   in response to establishing the new communication period, not attempting the resumption of the previously established communication period until a fourth TP, the next TP after the third TP.

4. The method of claim 1 further comprising:
   transferring information during a at communication period; and,
   wherein resuming the previously established communication period includes continuing the transfer of information in a resumed first communication period.

5. The method of claim 4 further comprising:
   following a complete transfer of information, not attempting the resumption of the first communication period in subsequent TPs.

6. The method of claim 4 wherein transferring information during the first communication period includes buffering the information to be transferred in the first communication period;
   wherein continuing the transfer of information in the resumed communication period includes:
      saving the buffered information during the initiation of the new communication period; and,
      transferring the saved information from the buffer when the first communication period is resumed.

7. The method of claim 4 wherein establishing the plurality of TPs includes establishing a plurality of TPs between a master and a corresponding plurality of slaves; and,
   wherein initiating the new communication period includes transmitting to initiate a new communication period between the master and a corresponding slave at each TP.

8. The method of claim 7 wherein establishing the plurality of TPs between the master and the corresponding plurality of slaves includes establishing a Bluetooth piconet with at least one master and at least one slave.

9. The method of claim 7 wherein establishing the plurality of TPs between the master and the corresponding plurality of slaves includes establishing a Bluetooth scatternet with a plurality of masters.

10. The method of claim 9 wherein establishing the Bluetooth scatternet with the plurality of masters includes forming a scatternet with a unit that is the master in a piconet and a slave in at least one other piconet.

11. The method of 7 wherein establishing the plurality of TPs between the master and the corresponding plurality of slaves includes establishing time slots for each master and slave transmission;
    wherein failing to establish the communication link includes:
       attempting communications in an assigned time slot;
       failing to receive a response; and,
       ceasing communication attempts after a first plurality of time slots; and,
    wherein resuming the previously established communication period includes attempting to resume a previously established communication period, in time slots subsequent to the first plurality of time slots.

12. The method of claim 11 wherein attempting to resume the previously established communication period in the time slots subsequent to the first plurality of time slots includes attempting communications in a second plurality of time slots subsequent to the first plurality of time slots.

13. The method of claim 11 wherein establishing the plurality of TPs includes establishing a pseudorandom rendezvous schedule.

14. The method of claim 11 wherein initiating the new communication period includes:

a slave monitoring for the master transmitting in a master-to-slave time slot;

in response to the slave receiving a transmission from the master, transmitting the response; and, transferring information between the master and the slave.

15. The method of claim 14 wherein failing to establish the communication link includes:

the master transmitting to the slave in the slave's assigned time slot; and, not receiving the response; and, wherein resuming the previously established communication period includes the master delaying a period of time approximately equal to the time required to receive a response from the master's last transmission.

16. The method of claim 14 wherein failing to establish the communication link includes:

a first slave monitoring a plurality of master-to-slave time slots; and, not receiving a transmission addressed to the first slave.

17. The method of claim 12 wherein ceasing communication attempts after the first plurality of time slots includes varying the value of the first plurality in response to channel conditions; and, wherein attempting communications to resume the previously established communication period in the second plurality of time slots, subsequent to the first plurality of time slots, includes varying the value of the second plurality in response to channel conditions.

18. In a rendezvous scheduled communication system, a system for reestablishing communication periods, the system comprising:

a plurality of units including:

a second unit including:

a second unit timer with an output to supply time points (TPs); and, a second unit transceiver with an input to accept TPs from the second unit timer and a network-connected port for communication monitoring and information transfer in response to the TPs;

a first unit including:

a first unit timer with an output to supply TPs; and;

a first unit transceiver with an input to accept the TPs from the first unit timer and a network-connected port to initiate a new communication period with a third unit in response to a first TP, and to initiate the resumption of a previously established communication period with the second unit before the occurrence of a second TP, the next TP after the first TP, in the event that the new communication period is terminated in response to an action selected from a group consisting of failing to establish a communication link with the third unit and establishing a short communication period with the third unit that ends before the occurrence of second TP because no additional information is to be transferred between the units: and, wherein the first unit resumes the previously established communication period in a first number of consecutive TPs, in response to attempting, and failing to establish new communication periods in the first number of consecutive TPs.

19. The system of claim 18 wherein the first unit and the second unit end the resumed previously established communication period at the occurrence of the second TP.

20. The system of claim 18 wherein the first unit establishes the new communication period that ends at a third TP, the next TP after the second TP, and does not attempt the resumption of the previously established communication period until a fourth TP, the next TP after the third TP.

21. The system of claim 18 wherein the first and second units begin the transfer information during a first communication period, and continue the transfer of information in a resumed first communication period.

22. The system of claim 21 wherein the first unit does not attempt the resumption of the first communication period with the second unit in subsequent TPs, following the complete transfer of information.

23. The system of claim 21 wherein the first and second units buffer the information to be transferred during the first communication period, and continue the transfer of information in the resumption of the first communication period by:

saving the buffered information when the new communication period is initiated; and, transferring the saved information from the buffer if the first communication period is resumed.

24. The system of claim 21 wherein the unit timers supply a coordinated TP rendezvous schedule to their respective transceivers.

25. The system of claim 24 wherein the first unit and the second unit are master and slave units in a Bluetooth piconet.

26. The system of claim 24 wherein the plurality of units establish a Bluetooth scatternet including a plurality of master units and at least one slave unit.

27. The system of claim 26 wherein a unit performs as a master unit in a first piconet and a slave unit in at least one other piconet.

28. The system of 24 wherein the unit timers supply time slot control signals to their respective transceivers to regulate transceiving timing; and, wherein the first unit ceases communication attempts to the third unit in the third unit's assigned time slot after failing to communicate in a first plurality of time slots, and resumes the first communication period in time slots subsequent to the first plurality of time slots.

29. The system of claim 28 wherein the first unit attempts to communicate with the second unit, to resume the first communication period in a second plurality of time slots, subsequent to the first plurality of time slots.

30. The system of claim 28 wherein the unit timers supply a coordinated pseudorandom rendezvous schedule of TPs.

31. The system of claim 26 wherein the slave unit transceiver monitors for a master unit transmitting in its assigned time slot, transmits a response, establishes a new communication period with the master unit, and transfers information with the master unit.

32. The system of claim 31 wherein a master unit transceiver attempts communications with a first slave unit in the first slave's assigned time slot, and if a response is not received, delays a period of time approximately equal to the time required to receive a response from the master unit's last transmission, before attempting to resume the first communication period with a second slave unit.

33. The system of claim 31 wherein the slave unit fails to establish a new communication period in response to the transceiver not receiving transmission in the slave unit's assigned time slot.

34. The system of claim 29 wherein each unit further includes:

a channel monitor with a output to supply measured transceiver channel conditions; and, a calculator having an input connected to the channel monitor output to vary the value of the first plurality and the second plurality of time slots in response to the channel conditions.

35. In a rendezvous scheduled communication system, a method for reestablishing communication periods, the method comprising:

establishing a plurality of time points (TPs);

initiating a new communication period at a first TP;

terminating the new communication period in response to performing an action selected from the group including failing to establish a communication link and establishing a short communication period that ends before the occurrence of a second TP, the next TP after the first TP;

resuming a previously established communication period before the occurrence of the second TP;

ending the resumed communication period at the occurrence of the second TP;

subsequent to the second TP, establishing the new communication period that ends at a third TP, the next TP after the second TP; and, in response to establishing the new communication period, not attempting the resumption of the previously established communication period until a fourth TP, the next TP after the third TP.

36. In a rendezvous scheduled communication system, a system for reestablishing communication periods, the system comprising:

a plurality of units including:

a second unit including:

a second unit timer with an output to supply time points (TPs); and, a second unit transceiver with an input to accept TPs from the second unit timer and a network-connected port for communication monitoring and information transfer in response to the TPs;

a first unit including:

a first unit timer with an output to supply TPs;

a first unit transceiver with an input to accept the TPs from the first unit timer and a network-connected port to initiate a new communication period with a third unit in response to a first TP, and to initiate the resumption of a previously established communication period with the second unit before the occurrence of a second TP, the next TP after the first TP, in the event that the new communication period is terminated in response to an action selected from a group consisting of failing to establish a communication link with the third unit and establishing a short communication period with the third unit that ends before the occurrence of second TP; and, wherein the first unit establishes the new communication period that ends at a third TP, the next TP after the second TP, and does not attempt the resumption of the previously established communication period until a fourth TP, the next TP after the third TP.

* * * * *